US009946295B2

United States Patent
Smith et al.

(10) Patent No.: US 9,946,295 B2
(45) Date of Patent: *Apr. 17, 2018

(54) FLEXIBLE KEYBOARD ACCESSORY FOR A PORTABLE ELECTRONIC DEVICE

(71) Applicant: Apple Inc., Cupertino, CA (US)

(72) Inventors: Samuel Gilkison Smith, Cupertino, CA (US); Daniel J. Coster, San Francisco, CA (US); Sean S. Corbin, San Jose, CA (US); Melody L. Kuna, Cupertino, CA (US); Siddhartha Hegde, San Jose, CA (US); Benjamin A. Cousins, Cupertino, CA (US); Robert Sean Murphy, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/256,433

(22) Filed: Sep. 2, 2016

(65) Prior Publication Data

US 2017/0068281 A1    Mar. 9, 2017

Related U.S. Application Data

(60) Provisional application No. 62/214,671, filed on Sep. 4, 2015.

(51) Int. Cl.
   *G06F 1/16*       (2006.01)
   *G06F 1/20*       (2006.01)

(52) U.S. Cl.
   CPC .......... *G06F 1/1628* (2013.01); *G06F 1/1615* (2013.01); *G06F 1/1654* (2013.01);
   (Continued)

(58) Field of Classification Search
   CPC .... G06F 1/1615; G06F 1/1628; G06F 1/1654; G06F 1/1669
   See application file for complete search history.

(56) References Cited

U.S. PATENT DOCUMENTS

| | | | |
|---|---|---|---|
| 6,700,775 B1 * | 3/2004 | Chuang | G06F 1/1626 361/679.01 |
| 8,624,695 B2 * | 1/2014 | Cretella, Jr. | G06F 1/1626 206/320 |

(Continued)

FOREIGN PATENT DOCUMENTS

| | | |
|---|---|---|
| CN | 102156510 A | 8/2011 |
| CN | 102622052 A | 8/2012 |

(Continued)

OTHER PUBLICATIONS

International Search Report dated Nov. 24, 2016 in PCT Application No. PCT/US2016/048081.

(Continued)

*Primary Examiner* — Nidhi Thaker
(74) *Attorney, Agent, or Firm* — Downey Brand LLP

(57) ABSTRACT

An accessory device for use with an electronic device is disclosed. The accessory device may include a cover configured to overlay an electronic device (or device) or fold to form a support structure for the electronic device. The cover may include an attachment feature that electrically couples with the device, and a keyboard foldable with respect to the cover. Further, the keyboard may include a retention feature designed to receive the attachment feature in a folded configuration of the cover. The accessory device may further include an electrically conductive fabric that folds with the cover. The accessory device may include an array of magnets throughout the attachment feature, the cover, and the keyboard. The magnets may be used to magnetically couple together 1) segments of the cover, 2) the cover and the keyboard assembly, 3) and/or the device with the cover.

19 Claims, 14 Drawing Sheets

(52) U.S. Cl.
CPC .......... *G06F 1/1656* (2013.01); *G06F 1/1669* (2013.01); *G06F 1/1681* (2013.01); *G06F 1/20* (2013.01); *G06F 2200/1633* (2013.01)

(56) References Cited

U.S. PATENT DOCUMENTS

| | | | |
|---|---|---|---|
| 8,665,045 B2 | 3/2014 | Lauder et al. | |
| 8,717,132 B2* | 5/2014 | Lancaster-Larocque | G06F 1/1616 335/207 |
| 8,780,535 B2 | 7/2014 | Mongan et al. | |
| 8,817,457 B1* | 8/2014 | Colby | G06F 1/1669 206/320 |
| 8,947,864 B2* | 2/2015 | Whitt, III | G06F 1/1618 361/679.09 |
| 9,285,839 B1* | 3/2016 | Cudak | G06F 1/1677 |
| 2002/0085338 A1 | 7/2002 | Lin | |
| 2002/0186206 A1 | 12/2002 | Lee et al. | |
| 2006/0019178 A1 | 8/2006 | Tuhkala | |
| 2006/0191780 A1* | 8/2006 | Tuhkala | H01H 13/702 200/515 |
| 2010/0147562 A1* | 6/2010 | Chu | B32B 5/26 174/254 |
| 2012/0069540 A1* | 3/2012 | Lauder | G06F 1/1626 361/807 |
| 2012/0087100 A1 | 4/2012 | Ku | |
| 2012/0194448 A1* | 8/2012 | Rothkopf | A45C 13/002 345/173 |
| 2013/0016467 A1* | 1/2013 | Ku | F16M 11/10 361/679.08 |
| 2014/0071607 A1 | 3/2014 | Frinak et al. | |
| 2014/0211393 A1* | 7/2014 | Lee | G06F 1/1626 361/679.12 |
| 2015/0041341 A1* | 2/2015 | Marshall | A45C 11/00 206/45.2 |

FOREIGN PATENT DOCUMENTS

| | | |
|---|---|---|
| CN | 102692963 A | 9/2012 |
| CN | 103180796 A | 6/2013 |
| CN | 103294124 A | 9/2013 |
| CN | 103576745 A | 2/2014 |
| WO | 2012036891 A3 | 8/2012 |

OTHER PUBLICATIONS

Chinese Patent for Utility Model No. ZL201621028407.6—Evaluation Report dated Jul. 6, 2017.

* cited by examiner

FLEXIBLE KEYBOARD ACCESSORY FOR A PORTABLE ELECTRONIC DEVICE

CROSS-REFERENCE TO RELATED APPLICATION(S)

This application claims the benefit of priority under 35 U.S.C. § 119(e) to U.S. Provisional Application No. 62/214,671, filed on Sep. 4, 2015, and titled "FEATURES OF A FLEXIBLE KEYBOARD ACCESSORY FOR A PORTABLE ELECTRONIC DEVICE," the disclosure of which is incorporated herein by reference in its entirety.

FIELD

The following description relates to an accessory device used in conjunction with an electronic device. In particular, the following description relates to an accessory device used to support and protect the electronic device in various foldable configurations. Further, the accessory device may include a keyboard assembly used to generate an input or command to the electronic device. When coupled with the electronic device, the accessory device also may be in electrical communication with the electronic device.

BACKGROUND

An accessory device is used with an electronic device. Further, an accessory device provides a protective cover for the electronic device, by coupling with and folding over the electronic device. Also, some accessory devices include layers of different materials designed to provide an aesthetic appearance.

SUMMARY

In one aspect, an accessory device suitable for use with an electronic device is described. The accessory device may include a foldable cover that includes an attachment feature configured to couple with the electronic device. The accessory device may further include a keyboard assembly hingedly coupled with the foldable cover allowing the keyboard assembly to rotate with respect to the foldable cover. The keyboard assembly may include a retention feature configured to receive the attachment feature. The accessory device may further include an electrically conductive fabric extending from the attachment feature to the keyboard assembly. In some instances, the electrically conductive fabric provides an electrical communication path between the electronic device and the keyboard assembly.

In another aspect, an accessory device suitable for use with an electronic device. The electronic device may include a display assembly, a first device magnet having a first magnetic polarity, a second device magnet having a second magnetic polarity opposite the first magnetic polarity, and an electrical contact. The accessory device may include a cover having a size and shape to overlay the display assembly. The accessory device may further include a keyboard rotatably coupled with the cover. The accessory device may further include an attachment feature secured with the cover. The attachment feature may include a first magnet having the second magnetic polarity to magnetically couple with the first device magnet. The attachment feature may further include a second magnet having the first magnetic polarity to magnetically couple with the second device magnet. The attachment feature may further include a contact that electrically couples with the electrical contact to place the electronic device in electrical communication with the keyboard.

In another aspect, an accessory device suitable for use with an electronic device. The accessory device may include a cover that releasably couples with the electronic device. The accessory device may further include a keyboard assembly secured with the cover by a hinge. The accessory device may further include a support layer embedded in the hinge. In some embodiments, the keyboard assembly is foldable with respect to the cover in a first direction. Also, in some embodiments, the support layer limits movement of the keyboard assembly in a second direction opposite the first direction.

Other systems, methods, features and advantages of the embodiments will be, or will become, apparent to one of ordinary skill in the art upon examination of the following figures and detailed description. It is intended that all such additional systems, methods, features and advantages be included within this description and this summary, be within the scope of the embodiments, and be protected by the following claims.

BRIEF DESCRIPTION OF THE DRAWINGS

The disclosure will be readily understood by the following detailed description in conjunction with the accompanying drawings, wherein like reference numerals designate like structural elements, and in which.

Figure 1:
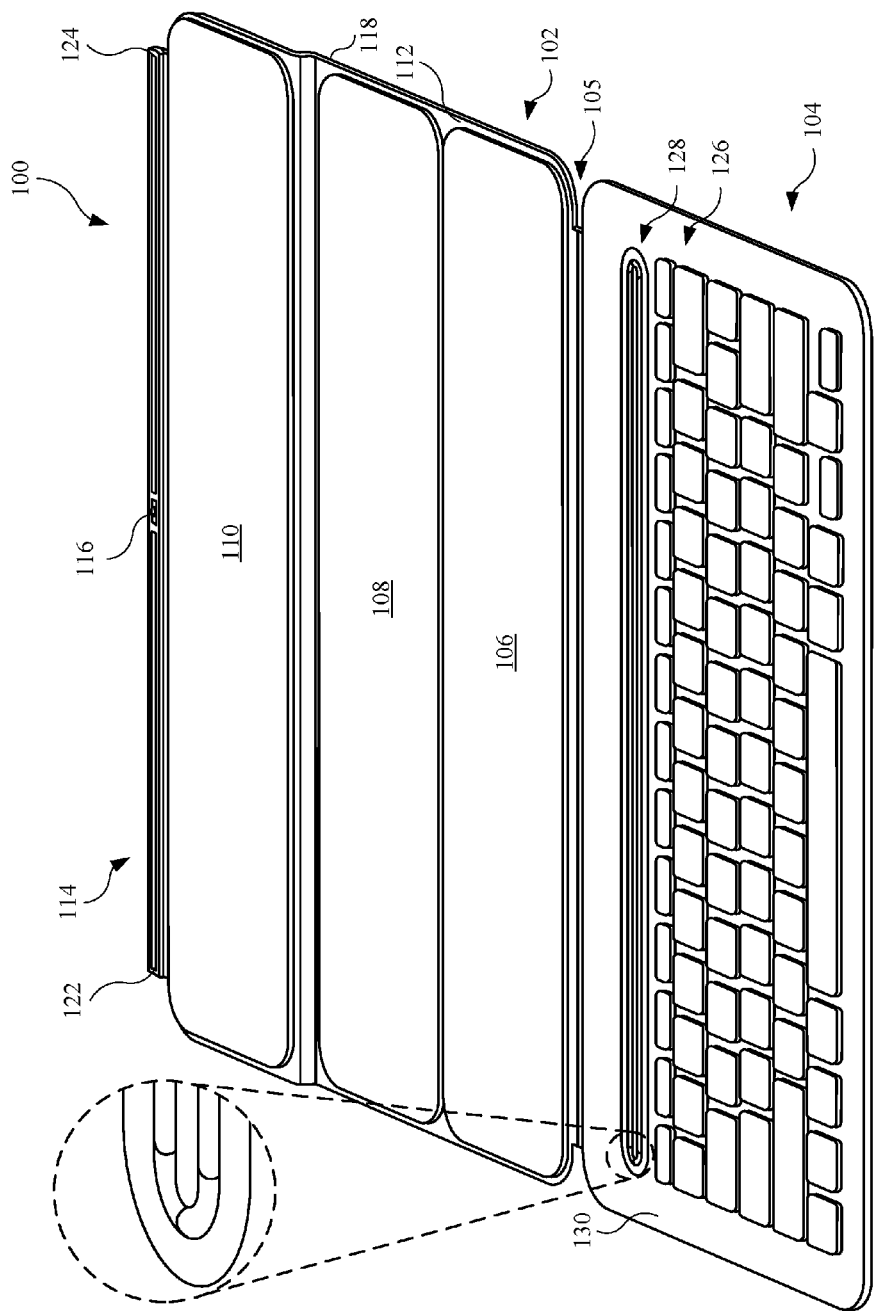
FIG. 1 illustrates an isometric view of an embodiment of an accessory device, in accordance with the described embodiments.

Those skilled in the art will appreciate and understand that, according to common practice, various features of the drawings discussed below are not necessarily drawn to scale, and that dimensions of various features and elements of the drawings may be expanded or reduced to more clearly illustrate the embodiments of the present invention described herein.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting such that other embodiments may be used, and changes may be made without departing from the spirit and scope of the described embodiments.

The following disclosure relates to an accessory device suitable for use with an electronic device. The accessory device may include a cover and a keyboard assembly secured with the cover. The accessory device may further include an attachment feature secured with the cover, and used to secure the electronic device with the accessory device by way of a magnet (or magnets) disposed in the attachment feature. Further, when the electronic device is secured with the accessory device, the attachment feature includes a contact that electrically couples with the electronic device. Also, the accessory device may include an electrically conductive fabric embedded between two or more layers of material, extending from the contact to the keyboard assembly. In this manner, the electronic device can be in electrical communication with the keyboard assembly by way of an electrically conductive fabric and the contact. Also, the cover can take the form of a foldable cover to support the electronic device in various folded configurations, and can also be unfolded to cover a display of the electronic device. The electrically conductive fabric may fold and unfold in accordance with the foldable cover.

The accessory device may include several magnets distributed internally throughout not only the attachment feature, but also the cover and the keyboard assembly. For example, the cover may include multiple segments that are foldable with respect to each other by way of fold regions between the segments, with the cover defining a support structure based upon a folded configuration of the segments. In order to maintain the folded configuration, several segments may include cover magnets embedded in the segments, allowing allow at least some segments to magnetically couple with one another and form several magnetic circuits to maintain engagement between the segments. The accessory device may include additional magnets to provide the accessory device with additional capabilities. For example, additional cover magnets embedded in the segments are positioned and designed to magnetically couple with keyboard magnets embedded in the keyboard assembly. In this regard, the keyboard assembly can magnetically couple with the cover when the keyboard assembly is folded onto the cover. Some of the cover magnets and the keyboard magnets may also be used to magnetically couple and secure the electronic device with the cover and the keyboard assembly, respectively.

Also, both the cover and the keyboard assembly may include a detection mechanism, such as a Hall effect sensor, designed to detect an external magnetic field generated by one or more magnets. The detection of the external magnetic field can correspond to a position of the cover with respect to the electronic device, or the cover with respect to the keyboard assembly. Further, the detection mechanism can determine that, for example, the keyboard assembly is not magnetically coupled with the cover. In this regard, in one embodiment, when the keyboard assembly is pulled away from the cover and positioned for use with the electronic device, the detection mechanism, in response to no longer detecting the external magnetic field, generates an electrical input (or input signal) to a processor of the electronic device (or in some cases, the accessory device), causing the keyboard assembly to power on. Accordingly, in order to operate, the keyboard assembly may use electrical current, which may be provided by the electronic device by way of the electrically conductive fabric.

In addition to providing a magnetic and electrical coupling with the electronic device, the attachment feature may be used to support the electronic device in a folded configuration. For example, the attachment feature magnets may magnetically couple with magnets in the keyboard assembly (in addition to magnets in the electronic device). Further, in a particular folded configuration, the attachment feature may be positioned in a retention feature of the keyboard assembly that provides a mechanical stop to limit and/or prevent movement of the attachment feature and, accordingly, the electronic device (coupled with the attachment feature). The keyboard assembly may also include additional keyboard magnets embedded in the keyboard and disposed below the retention feature. These keyboard magnets can magnetically couple with the attachment feature magnets. In this manner, the magnets positioned below the retention feature provide a magnetic attraction force and combine with the retention feature to maintain a fixed position of the attachment feature and, accordingly, the electronic device coupled with the attachment feature.

Also, while the keyboard assembly may be foldable with the respect to the cover, the accessory device may include features that limit movement of the keyboard assembly. For example, the accessory device may include a support layer that includes an embedded material extending along the cover and the keyboard assembly. The material may include a liquid crystal polymer fiber material designed to allow some movement, and restrict other movement. For example, when the keyboard assembly is not in use, the keyboard assembly may be folded over and onto the cover. However, to use the keyboard assembly, a user may fold the keyboard assembly away from the cover. The support layer may limit the movement of the keyboard assembly with respect to cover by limiting rotational movement of the keyboard assembly to 180 degrees, or approximately 180 degrees, with respect to the cover. In this manner, the keyboard assembly may present itself in a flat or horizontal manner, co-planar with the cover, and in a manner consistent with a keyboard assembly resting on a flat surface, such as a table, even though the keyboard assembly is unsupported by the flat surface. Further, the cover may be folded to support the electronic device at an angle with respect to the keyboard assembly to present the electronic device and the keyboard assembly in a configuration similar to a traditional portable computing device (such as a laptop). However, the accessory device may provide greater portability relative to the portable computing device by detaching from the electronic device, thereby allowing the accessory device to couple with another electronic device.

Also, the accessory device may be designed such that the electronic device can be constructed for use with additional accessory devices. For example, a case or shell, used to receive an enclosure of the electronic device, may include an opening that accommodates the accessory device, and in particular, the attachment feature of the accessory device. This allows for greater protection to the electronic device, and further allows a user to change accessories according to a desired preference.

These and other embodiments are discussed below with reference to FIGS. 1-20. However, those skilled in the art will readily appreciate that the detailed description given herein with respect to these Figures is for explanatory purposes only and should not be construed as limiting.

FIG. 1 illustrates an isometric view of an embodiment of an accessory device 100, in accordance with the described embodiments. The accessory device 100 may be suitable for use with an electronic device (not shown), such as a tablet computing device or a smartphone, when the electronic device is coupled with the accessory device 100. As shown, the accessory device 100 may include a cover 102 coupled with a keyboard assembly 104. The cover 102 may include a size and a shape to overlay, or cover, a display assembly (not shown) of an electronic device. In some embodiments, the cover 102 includes multiple segments. For example, as shown in FIG. 1, the cover 102 includes a first segment 106, a second segment 108, and a third segment 110. Each segment can include a panel (not shown) formed from a rigid material, such as glass fiber, to provide structural support. In order to form the segmented design, the first segment 106, the second segment 108, and the third segment 110 may undergo a de-boss operation to a desired shape. Also, each of the first segment 106, the second segment 108, and the third segment 110 may be moveable or rotatable with respect to the remaining segments by way of fold regions between adjacent segments. In this regard, the cover 102 may be referred to, and used as, as a foldable cover. The cover 102 may be folded into several distinct folded configurations, which will be shown and described below. Further, as shown in FIG. 1, the third segment 110 may be raised or elevated with respect to the first segment 106 and the second segment 108. The raised feature of the third segment 110 allows the keyboard assembly 104 to fold over and onto the first segment 106 and the second segment 108 such that the keyboard assembly 104, and in particular a rear portion (not shown) of the keyboard assembly 104, is co-planar, or flush, with respect to the third segment 110. This will be shown below.

Also, the cover 102 may include a first cover layer 112 and a second cover layer 118 that combines with the first cover layer 112 to cover each of the aforementioned segments and their respective panels. The first cover layer 112 and the second cover layer 118 may allow the keyboard assembly 104 to fold with respect to the cover 102, or vice versa. In this regard, the first cover layer 112 and the second cover layer 118 may combine to define a hinge 105 between the cover 102 and the keyboard assembly 104. However, in order to limit some movement of the keyboard assembly 104, the hinge 105 may further include a support layer (shown below) embedded between the first cover layer 112 and the second cover layer 118. The first cover layer 112 may include a fabric layer. The fabric may include microfiber, or generally, any material that provides a cosmetic enhancement while also not causing damage to a display assembly (not shown) of an electronic device. In some embodiments, the second cover layer 118 includes a polymer-based, low modulus elastomeric material that allows some flexibility of the attachment feature 114 with respect to the cover 102. In some embodiments, the second cover layer 118 includes a mixture of polyurethane and coal tar. In some embodiments, the second cover layer 118 includes silicone. Also, the second cover layer 118 may also come in a variety of colors. Also, the material forming the second cover layer 118 may further include relatively high adhesion to other components.

The cover 102 may further include an attachment feature 114 designed to receive and secure an electronic device with the accessory device 100. In this regard, the attachment feature 114 may include magnets (not shown) disposed in the attachment feature 114, with each magnet arranged to magnetically couple with one of several magnets (not shown) disposed in an electronic device. Further, the accessory device 100 may include an electrical contact 116 designed to electrically couple with an electrical contact (not shown) of an electronic device when the electronic device is used with the accessory device 100. Accordingly, the electrical contact 116 may be formed from an electrically conductive material, such as a metal. Also, in other embodiments, the attachment feature 114 includes two or more electrical contacts designed to electrically couple with a corresponding number of electrical contacts in an electronic device. Also, the attachment feature 114 may be coupled with the cover 102 by way of the second cover layer 118 that extends from the cover 102 and wraps around the attachment feature 114 to define a top, or upper, surface of the attachment feature 114. This will be shown and described below.

The second cover layer 118 may further include abrasion-resistant properties. In this regard, the second cover layer 118 may include a relatively high coefficient of friction, which may limit or prevent movement of an electronic device (not shown) should the electronic device engage the portion of the second cover layer 118 that covers the attachment feature 114. However, in order to lower the coefficient of friction at the attachment feature 114, the attachment feature 114 may include a first layer 122 and a second layer 124 surrounding the electrical contact 116 and combining to substantially cover the attachment feature 114 in a location that receives the electronic device. The first layer 122 and the second layer 124 may include a lower coefficient of friction relative to the second cover layer 118, allowing the electronic device to slide against the first layer 122 and the second layer 124 to align and couple with the attachment feature 114.

The keyboard assembly 104 may include keys 126 positioned throughout the keyboard assembly 104. The keys 126 may include a QWERTY configuration commonly known in the art for a keyboard. However, in other embodiments, the keys 126 include a different configuration according to a language or dialect. The keyboard assembly 104 may include a printed circuit board (not shown) embedded in the keyboard assembly 104 and electrically coupled with the keys 126. The keyboard assembly 104 may further include a retention feature 128 disposed across, and protruding from, a top surface 130 of the keyboard assembly 104. The retention feature 128 may be designed to at least partially receive the attachment feature 114 when the cover 102 is in a particular folded configuration. The retention feature 128 may provide a mechanical stop for the attachment feature 114 and an electronic device secured with the attachment feature 114. This will be shown below. As shown in FIG. 1, the retention feature 128 includes a ring-like configuration protruding from the top surface 130. However, in other embodiments, the retention feature 128 includes two or more discontinuous features that provide the mechanical stop feature similar to a manner previously described. Although not shown, in other embodiments, a trough or "valley" can be located within the retention feature 128 that positions a portion of the attachment feature 114 below the top surface 130. Also, the keyboard assembly 104 may include an array of magnets (not shown) disposed below the retention feature 128 that magnetically couple with attachment feature magnets in the attachment feature. By magnetically coupling with magnets in the attachment feature 114, the array of magnets below the retention feature 128 may combine with the retention feature 128 to hold the attachment feature 114 as well as an electronic device secured with the attachment feature 114. This will be shown below.

Figure 2:
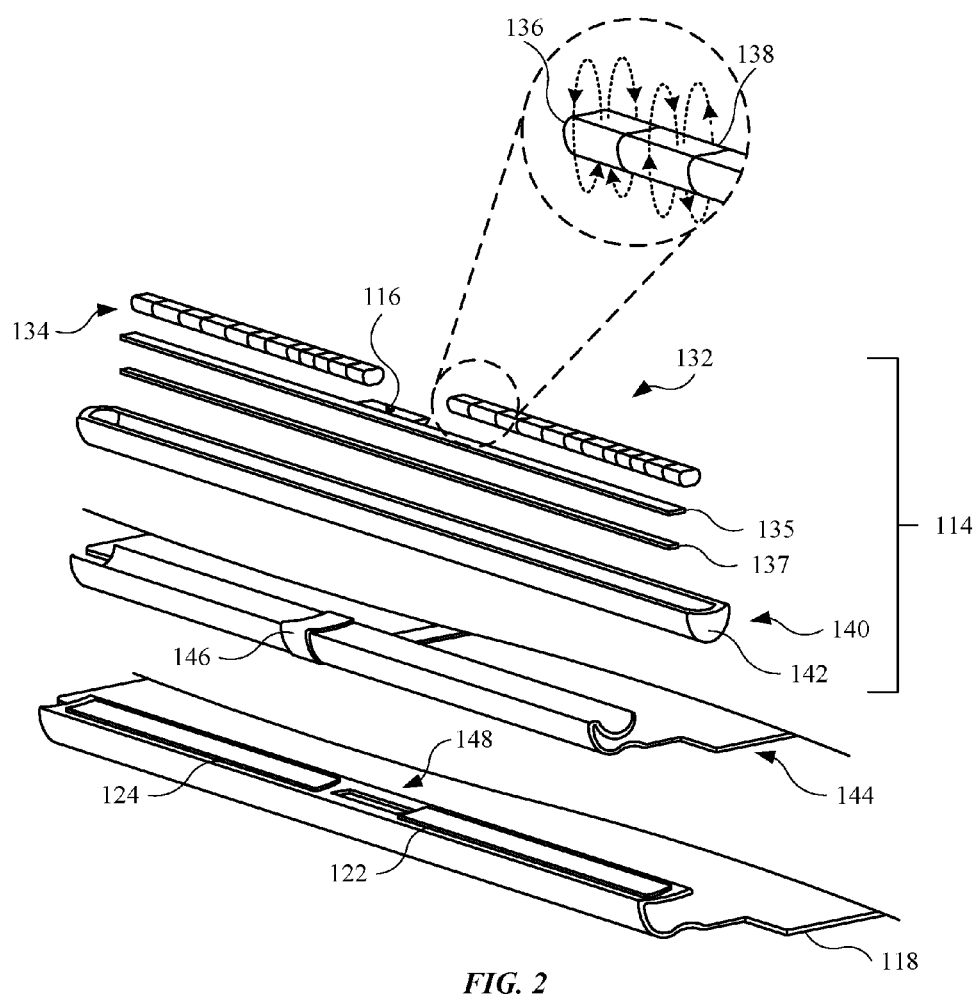
FIG. 2 illustrates an exploded view of the attachment feature, showing several features that form the attachment feature.

FIG. 2 illustrates an exploded view of the attachment feature 114, showing several features that form the attachment feature 114. For example, the attachment feature 114 may include first attachment feature magnets 132 and second attachment feature magnets 134. In some embodiments, the first attachment feature magnets 132 and the second attachment feature magnets 134 include several magnets aligned together prior to assembly. In the embodiment shown in FIG. 2, the first attachment feature magnets 132 and the second attachment feature magnets 134 are formed form a composition of (initially) non-magnetized material that is magnetized prior to an assembly of the attachment feature 114. The first attachment feature magnets 132 and the second attachment feature magnets 134 may be placed under a camera/sensor assembly (not shown) and aligned with a magnetizer (not shown) according to a desired alignment between the electrical contact 116 and an electronic device (not shown). This allows for a customized magnetization, or customized external magnetic field, that improves a magnetic alignment between the accessory device 100 (shown in FIG. 1) and an electronic device, thereby improving a magnetic coupling between the accessory device 100 and the electronic device.

FIG. 2 further shows the first attachment feature magnets 132 and the second attachment feature magnets 134 having several magnetized regions. As shown, the magnetized regions may include regions of different sizes. This may promote the customized external magnetic field previously described. Also, as known by one of ordinary skill in the art, a magnet generally includes a magnetic polarity having a "North" facing polarity, or North Pole, and a "South" facing polarity, or South Pole, with magnetic field lines pointing in a direction from the North Pole to the South Pole. Also, it is also understood by one of ordinary skill in the art that a North Pole of a magnet may be magnetically attracted to a South Pole of a magnet, and that two North poles, or two South poles, may magnetically repel one another. In this regard, adjacent magnetic regions of the first attachment feature magnets 132 and the second attachment feature magnets 134 may include magnet polarities designed to produce external magnetic fields pointing in opposite directions.

For example, as shown in the enlarged view, the first attachment feature magnets 132 may include a first magnetic region 136 and a second magnetic region 138 adjacent to the first magnetic region 136. The first magnetic region 136 may include an external magnetic field (shown as dotted lines) in accordance with a first magnetic polarity, indicative of a top surface having a North pole and a bottom surface (not shown) opposite the top surface having a South pole. Conversely, the second magnetic region 138 may include an external magnetic field (shown as dotted lines) in accordance with a second magnetic polarity that is opposite the first magnetic polarity, indicative of a top surface having a South pole and a bottom surface (not shown) opposite the top surface having a North pole. This pattern of adjacent magnetic regions having opposing magnetic polarities may be representative of magnetic regions of the first attachment feature magnets 132 and the second attachment feature magnets 134. While a particular magnetic polarity is shown, the arrangement may be reversed for the first magnetic region 136 and the second magnetic region 138, as well as remaining magnetic regions. Also, as previously stated, the magnetic regions may differ in size. For example, as shown, the first magnetic region 136 is smaller than that of the second magnetic region 138. Other size differences are possible.

Also, as shown in FIG. 2, the electrical contact 116 may be disposed on, and in electrical communication with, a flexible circuit assembly 135. Also, the attachment feature 114 may include a magnetic shunt 137 formed from a metal, including soft steel, such that the magnetic shunt 137 is magnetically attracted to the first attachment feature magnets 132 and the second attachment feature magnets 134. Also, the magnetic shunt 137 may contain the external magnetic field of the first attachment feature magnets 132 and the second attachment feature magnets 134 in one location, and direct the magnetic fields of the first attachment feature magnets 132 and the second attachment feature magnets 134 in a direction towards magnets in an electronic device (not shown). The attachment feature 114 may further include a protective component 140 that includes a metal layer (not shown) such as stainless steel. The protective component 140 may be designed to receive the first attachment feature magnets 132, the second attachment feature magnets 134, the flexible circuit assembly 135, and the magnetic shunt 137. Also, the protective component 140 may include a coating 142 covering the protective component 140 and providing an aesthetic finish for the protective component 140. In some embodiments, the coating 142 includes a photothermolplastic ("PTP") material that includes polyurethane plus a thermoplastic.

The attachment feature 114 may further include several additional features. For example, the attachment feature 114 may include a portion of an electrically conductive fabric 144 designed to provide electrical communication path between an electronic device and the keyboard assembly 104 (shown in FIG. 1). The electrically conductive fabric 144 may wrap around the protective component 140 and electrically couple with the flexible circuit assembly 135, and continue to extend to the keyboard assembly 104. Accordingly, the electrically conductive fabric 144 may electrically couple with the electrical contact 116. In some embodiments, the electrically conductive fabric 144 includes a body that is electrically conductive throughout its entirety. In the embodiment shown in FIG. 2, the electrically conductive fabric 144 includes an electrically conductive portion 146 designed to provide the electrical communication path between the aforementioned components. Also, the second cover layer 118 may also wrap around the attachment feature 114 and the electrically conductive fabric 144 to combine with the first layer 122 and the second layer 124 and define a top surface of the attachment feature 114. As shown, the second cover layer 118 may include an opening 148 that allow the electrical contact 116 to couple with an electrical contact of an electronic device.

Figure 3:
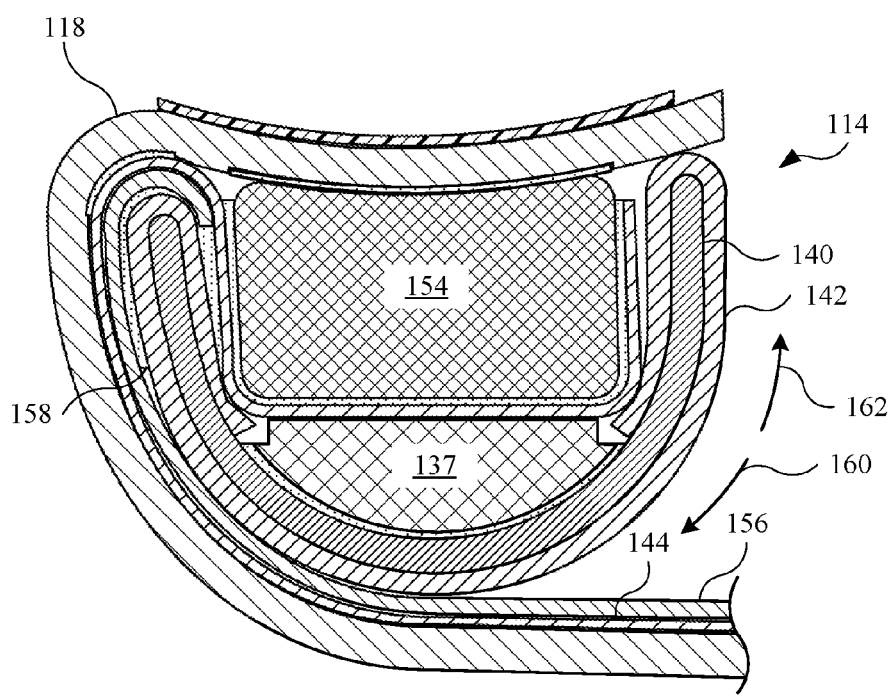
FIG. 3 illustrates a cross sectional view of the attachment feature, showing the various components of the attachment feature assembled together.

FIG. 3 illustrates a cross sectional view of the attachment feature 114, showing the various components of the attachment feature 114 assembled together. As shown, the coating 142 surrounds the protective component 140. The protective component 140 is generally U-shaped, but may vary according to a desired shape of the attachment feature 114. Also, the protective component 140 may receive a magnet 154, which may be one of the magnets of the first attachment feature magnets 132 or the second attachment feature magnets 134 (shown in FIG. 2), as well as the magnetic shunt 137. Also, the second cover layer 118 and the electrically conductive fabric 144 may wrap around the coating 142. Also, the second cover layer 118 may extend over an uppermost surface of the magnet 154. The attachment feature 114 may further include an inner layer 156 designed to provide cover one or more layers, and provide an aesthetic appearance to the accessory device. The inner layer 156 may include PTP. Further, as shown, the second cover layer 118 may combine with the inner layer 156 to cover the electrically conductive fabric 144.

The inner layer 156 may be adhesively secured with an upper portion of the attachment feature 114, with the upper portion associated with an uppermost surface of the attachment feature 114 as shown in FIG. 3. For example, an adhesive layer 158 between the inner layer 156 and the coating 142 may partially extend only along of the coating 142. This allows for better ease of movement of the attachment feature 114 to rotate a clockwise (in a direction denoted by an arrow 160) and/or counterclockwise manner (in a direction denoted by an arrow 162) about the adhesive layer 158. Accordingly, the second cover layer 118 may further cover the attachment feature 114 when the attachment feature 114 is rotated clockwise, and also uncover the attachment feature 114 when the attachment feature 114 is rotated counterclockwise. Also, although not specifically shown, other features shown and described in FIG. 3 may be adhesively secured together.

Figure 4:
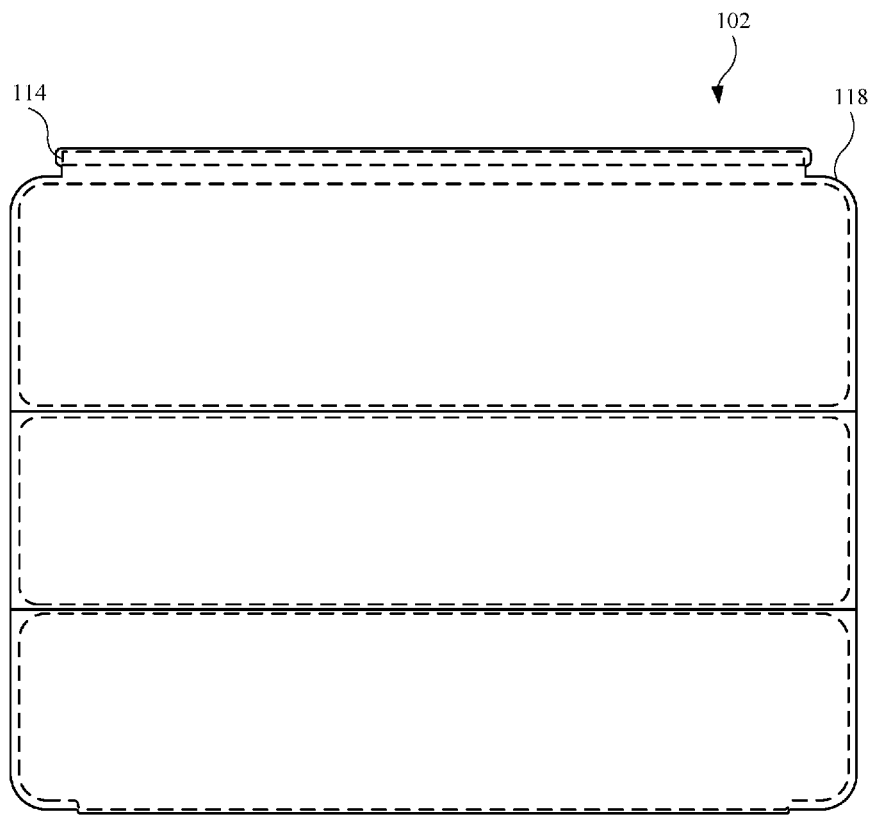
FIG. 4 illustrates a plan view showing the cover, showing the second cover layer extending to wrap around and overlay the attachment feature (as shown in FIG. 3)

FIG. 4 illustrates a plan view showing the cover 102, showing the second cover layer 118 extending to wrap around and overlay the attachment feature 114 (as shown in FIG. 3). In this manner, the second cover layer 118 may provide the cover 102 with an exterior surface having a consistent finish in terms of appearance (including color) and feel (including texture and roughness), as the second cover layer 118 provides a consistent finish from the attachment feature 114 to an end of the cover 102 opposite the attachment feature 114. While the second cover layer 118 is described as including a polymer-based material, in other embodiments, the second cover layer 118 includes leather. Generally, the second cover layer 118 may include any material capable of bending while also adhering to features of the cover 102.

Figure 5:
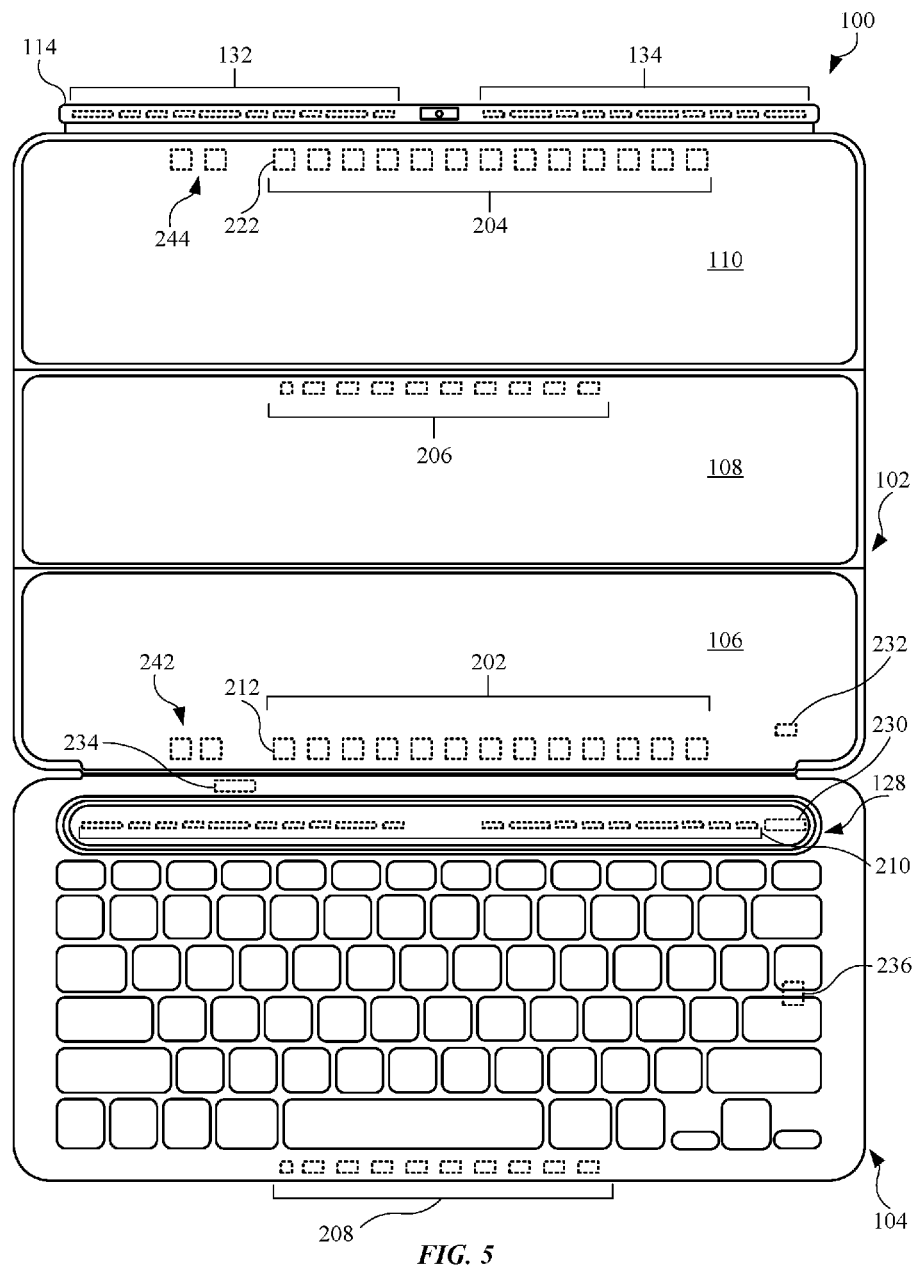
FIG. 5 illustrates a plan view of the accessory device, showing several magnets and detection mechanisms positioned throughout the accessory device.

FIG. 5 illustrates a plan view of the accessory device 100, showing several magnets and detection mechanisms positioned throughout the accessory device 100. The magnets shown and described in FIG. 5 may include dotted lines to denote the magnets are positioned between two or more layers of material. As shown, the first segment 106 and the third segment 110 (of the cover 102) may include first cover magnets 202 and second cover magnets 204, respectively, with each aforementioned cover magnets including several magnetic elements. In certain folding configurations (shown and described below), the second cover magnets 204 may magnetically couple with the first cover magnets 202 such that the first segment 106 remains engaged with the third segment 110 by way of several magnetic circuits formed between the first cover magnets 202 and the second cover magnets 204. For example, the first cover magnets 202 include a magnetic element 212 and the second cover magnets 204 include a magnetic element 222 designed to magnetically couple with the magnetic element 212 in the first segment 106. Also, the first cover magnets 202 and the second cover magnets 204 may include adjacent magnets having magnetic polarities designed to form an external magnetic field in opposite directions, similar to a magnetic arrangement of the first attachment feature magnets 132 (shown in FIG. 2). Accordingly, the magnets of the first cover magnets 202 and the second cover magnets 204 may define alternating magnetic polarities (with respect to adjacent magnets). The remaining magnets in the first cover magnets 202 and the second cover magnets 204 may include similar relationships as those described. Also, the first cover magnets 202 may include an equal as the number of magnetic elements as that of the second cover magnets 204.

Also, in some folded configurations, the keyboard assembly 104 may magnetically couple with the cover 102 to retain the keyboard assembly 104 with the cover 102. For example, the second segment 108 of the cover 102 may include third cover magnets 206 designed to magnetically couple with first keyboard magnets 208 (disposed in the keyboard assembly 104) when the keyboard assembly 104 is folded over and onto, or nearly onto, the cover 102, and in particular, over and onto the first segment 106 and the second segment 108. This will be shown below. Also, it will be appreciated that magnets in the third cover magnets 206 and the first keyboard magnets 208 may include similar relationships, such as adjacent magnetic elements having alternative magnetic polarities in a manner previously described. Further, the magnetic polarities of the magnets in the third cover magnets 206 may be opposite of corresponding magnets (forming a North-South polarity alignment between the magnetic elements) in the first keyboard magnets 208 such that several magnetic circuits are formed between magnetic elements of the third cover magnets 206 and magnets of the first keyboard magnets 208 when the keyboard assembly 104 is folded over and onto, or nearly onto, the cover 102. This also implies that the third cover magnets 206 may include an equal as the number of magnetic elements as that of the first keyboard magnets 208.

The magnetic polarities of the magnetic elements in the first attachment feature magnets 132 and the second attachment feature magnets 134 (both in the attachment feature 114) were previously described as having a magnetic polarity such that the first attachment feature magnets 132 and the second attachment feature magnets 134 may magnetically couple with magnets in an electronic device (not shown). However, the magnets in the first attachment feature magnets 132 and the second attachment feature magnets 134 may also magnetically couple with second cover magnets 210 disposed below the retention feature 128 of the keyboard assembly 104 when the attachment feature 114 is positioned, or nearly positioned, in the retention feature 128. In this regard, each magnet in the first attachment feature magnets 132 and the second attachment feature magnets 134 may include a magnetic polarity to magnetically couple with a magnet in the second cover magnets 210 of magnets in the retention feature 128. This may allow the retention feature 128 further secure the attachment feature 114 and an electronic device (not shown) coupled with the attachment feature 114. This also implies that the combined number of magnets in the first attachment feature magnets 132 and the second attachment feature magnets 134 may equal the number of magnets in the second cover magnets 210.

The accessory device 100 may include additional magnets and other associated features. For example, the accessory device 100 may include a first detection mechanism 230 in the keyboard assembly 104. In some embodiments, the first detection mechanism 230 is a Hall Effect sensor designed to detect an external magnetic field and generate an electrical signal, in response to detecting the external magnetic field, to indicate the presence of the external magnetic field. This may indicate a structural feature that carries a magnetic that generates the external magnetic field is present. Alternatively, the first detection mechanism 230 can be designed to generate an electrical signal, in response to no longer detecting the external magnetic field, to indicate the external magnetic field is no longer present, and may indicate a structural feature that carries a magnetic that generates the external magnetic field is no longer present. In other embodiments, the first detection mechanism 230 is a mechanical switch that closes a circuit in response to detecting an external magnetic field.

As shown, the cover 102 includes a magnet 232 (disposed in the first segment 106) that generates an external magnetic field (not shown) that may be detected by the first detection mechanism 230. For example, the first detection mechanism 230 may detect the magnet 232 (that is, the external magnetic field) when the keyboard assembly 104 is folded over and onto, or nearly onto, the cover 102. Then, the first detection mechanism 230 may generate an electrical signal to a processor circuit (not shown) in the accessory device 100, or an electronic device electrically coupled with the accessory device 100, causing the keyboard assembly 104 to power down as the keyboard assembly 104 is inaccessible to as user. Conversely, when the first detection mechanism 230 no longer detects the magnet 232, the keyboard assembly 104 may be folded away from the cover 102, causing the first detection mechanism 230 to communicate with the aforementioned processor circuit in the accessory device 100 or in the electronic device, and generate an electrical signal resulting in the keyboard assembly 104 receiving electrical current to power on. However, it should be noted that the keyboard assembly 104 may require some electrical current to function and may receive the electrical current from the electronic device coupled with the attachment feature 114.

The accessory device 100 may further include a second detection mechanism 234 in the keyboard assembly 104. The second detection mechanism 234 may include any type of detection mechanism previously described for a detection mechanism. The second detection mechanism 234 may be used to detect an external magnetic field from a magnet (not shown) in an electronic device. For example, when the attachment feature 114 is disposed in the retention feature 128, the second detection mechanism 234 may detect an external magnetic field emanating from the electronic device to indicate the electronic device is positioned upright with respect to the keyboard assembly 104, and provide an electrical signal to turn the keyboard assembly 104 on. However, when the second detection mechanism 234 no longer detects the external magnetic field, the second detection mechanism 234 may provide an indication in accordance with the lack of detected external magnetic field to the aforementioned processor circuit, which may cause the keyboard assembly 104 to power down. The accessory device 100 may further include a third detection mechanism 236 in the keyboard assembly 104 designed to provide a secondary, or redundant, indication of an event or current status of the accessory device 100 in relation to an electronic device. For example, the third detection mechanism 236 may detect whether an electronic device is present and whether the keyboard assembly 104 is engaged, or nearly, engaged with the electronic device. For example, when the keyboard assembly 104 is folded onto the first segment 106 and the second segment 108, the cover 102 may be folded onto the electronic device in a manner such that the third detection mechanism 236 detects an external magnetic field (not shown) in the electronic device. This folded configuration will be shown below. The third detection mechanism 236 may include any type of detection mechanism previously described for a detection mechanism.

Also, the cover 102 may include first compass magnets 242 and a second compass magnets 244, both of which may be used to create a neutral, or offsetting, external magnetic field with respect to a magnet or magnets in an electronic device. This may be useful for an electronic device that includes a compass or magnetometer that relies upon an external magnetic field in the atmosphere to determine a direction or orientation of the electronic device. For example, the first compass magnets 242 may provide an external magnetic field that counters, or neutralizes, an external magnetic field generated by one or more magnets in the first cover magnets 202 in the first segment 106 such that the compass or magnetometer in the electronic device does not falsely determine a direction or orientation based on a magnetic field generated by one or more magnets in the first cover magnets 202. The second compass magnets 244 may work in a similar manner to offset magnetic in the second cover magnets 204. Also, although the various magnets and detection mechanisms shown and described in FIG. 5 are located in discrete locations, some of the magnets may be arranged in other locations, as different arrangements may be suitable, so long as the same or substantially similar magnetic relationships are maintained.

Figure 6:
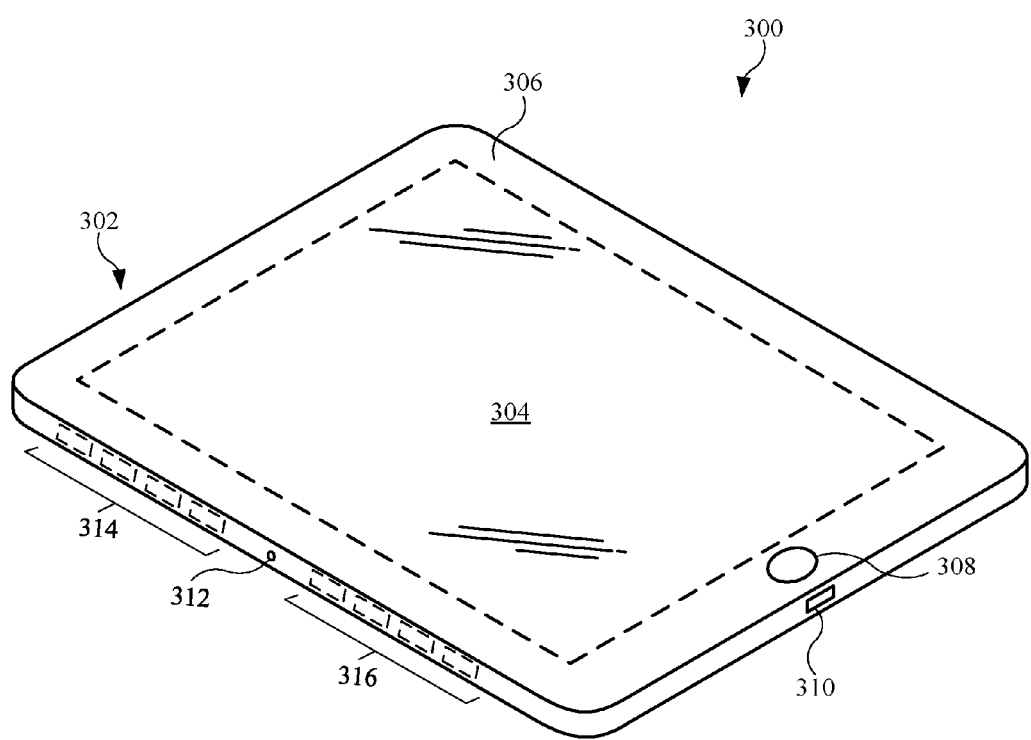
FIG. 6 illustrates an isometric view of an embodiment of an electronic device suitable for use with the accessory device shown in FIG. 1.

FIG. 6 illustrates an isometric view of an embodiment of an electronic device 300 suitable for use with the accessory device 100 (shown in FIG. 1). In some embodiments, the electronic device 300 is a mobile communications device, such as a smartphone. In the embodiment shown in FIG. 1, the electronic device 300 is a tablet computer device. The electronic device 300 may vary in shape and size. Also, the electronic device 300 may include an enclosure 302 designed to enclose and protect several internal components (not shown). In some embodiments, the enclosure 302 is formed from a metal, such as aluminum. Also, the electronic device 300 may include a display assembly 304 designed to present visual information to a user. In some embodiments, the display assembly 304 includes a touch sensitive layer designed to receive a touch input and generate a command, in accordance with the touch input, to a processor circuit (not shown) in the electronic device 300. Further, in some embodiments, the display assembly 304 includes a capacitive touch sensitive layer designed to generate an input based upon a capacitive coupling with the display assembly 304. Further, an outer protective layer 306 made from a transparent material, such as glass, may also overlay the display assembly 304. The cover 102 (shown in FIG. 1) may include a size and a shape to cover the outer protective layer 306, and accordingly, the display assembly 304. Also, in some embodiments, the electronic device 300 includes a force detection sensor (not shown) designed to detect an amount of force applied to the display assembly 304 and/or the outer protective layer 306, and provide a command based upon the amount of force detected.

The electronic device 300 may include a button 308 designed to receive an input corresponding to a command to the electronic device 300 (for example, to change the visual information shown on the display assembly 304). Also, the electronic device 300 may include a charge port 310 designed to receive power from a power source (not shown) in order to supply power an internal power source that powers internal components of the electronic device 300. The charge port 310 may also be used to provide communicate to and from the electronic device 300.

The electronic device 300 may further include an electrical contact 312 designed to electrically couple with an accessory device, and in particular, an electrical contact of an accessory device, such as the electrical contact 116 of the accessory device 100 (shown in FIG. 1). This may allow for electrical communication between internal components, such as processor circuits (not shown), of the electronic device 300 and an accessory device. The electronic device 300 may further include first device magnets 314 and second device magnets 316 disposed in the electronic device 300 along a sidewall of the enclosure 302. The first device magnets 314 may include several magnets having a magnetic polarity to magnetically couple with the first attachment feature magnets 132 in the attachment feature 114 (shown in FIG. 1). Similarly, the second device magnets 316 may include several magnets having a magnetic polarity to magnetically couple with the second attachment feature magnets 134 in the attachment feature 114 (also shown in FIG. 1). The magnetic circuits formed by multiple magnetic couplings may allow the electronic device 300 to magnetically couple with the accessory device 100 shown in FIG. 1.

Once an accessory device is coupled with an electronic, the accessory device may be folded into several different folded configurations. FIGS. 7-11 illustrate examples of several folded configurations of the accessory device 100 which may provide a use or benefit to a user of the electronic device 300. Some folded configurations may provide various types of support configuration while other folded configurations provide a protective configuration.

Figure 7:
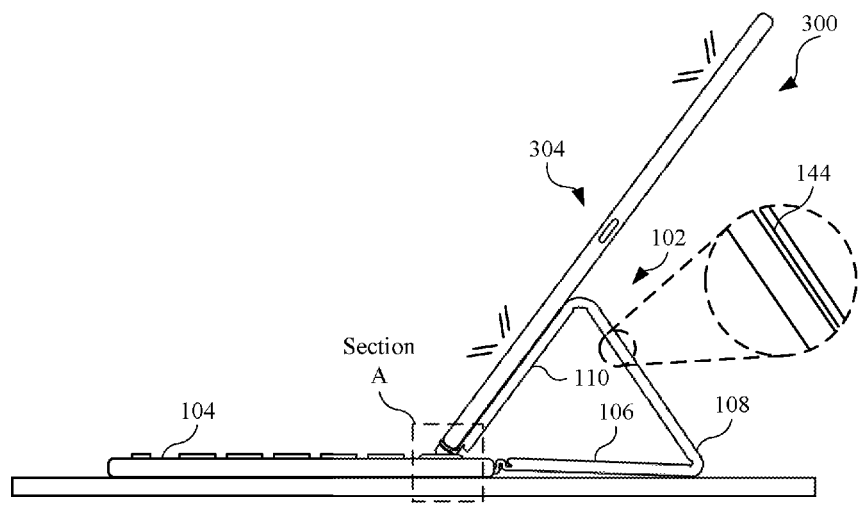
FIG. 7 illustrates a side view of the accessory device coupled with the electronic device, with the accessory device in a folded configuration to allow use of the keyboard assembly with the electronic device.

FIG. 7 illustrates a side view of the accessory device 100 coupled with the electronic device 300, with the accessory device 100 in a folded configuration to allow use of the keyboard assembly 104 with the electronic device 300. As shown, the folded configuration may include the first segment 106, the second segment 108, and the third segment 110 folded to form a triangular support for the electronic device 300. Further, the electronic device 300 may abut against the third segment 110. In this configuration, the keyboard assembly 104 may be used to provide an input device in order to generate input or command to the electronic device 300, and change the visual information (denoted as several diagonal lines) of the display assembly 304. This is due in part to the electrically conductive fabric 144 (that includes the electrically conductive portion 146 in FIG. 2), shown in the enlarged view, folding with the cover 102, and extending through the cover 102.

Figure 8:
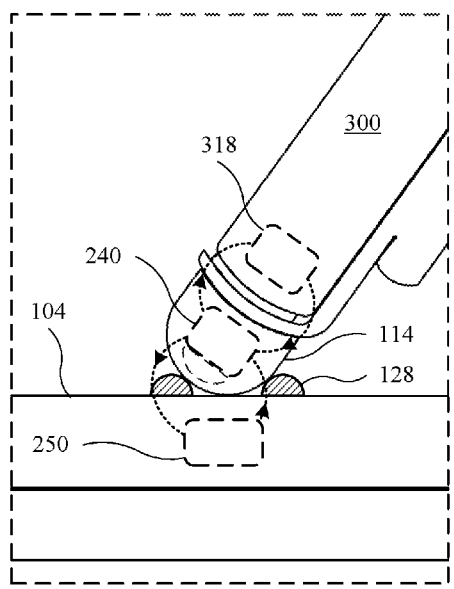
FIG. 8 illustrates an enlarged view of Section A, shown in FIG. 7, showing the attachment feature positioned in the retention feature.

FIG. 8 illustrates an enlarged view of Section A, shown in FIG. 7, showing the attachment feature 114 positioned in the retention feature 128. A partial cross sectional view of the retention feature 128 is shown to illustrate the retention feature 128 used to provide a mechanical stop for the attachment feature 114, as the attachment feature 114 is partially disposed in the retention feature 128. Also, as shown, the attachment feature 114 may include a magnet 240 that may be part of the first attachment feature magnets 132 or the second attachment feature magnets 134 (shown in FIG. 2) magnetically coupled with a magnet 318 that may be part of the first device magnets 314 or the second device magnets 316, respectively (shown in FIG. 6). The external magnetic field is shown as dotted lines having arrows. Also, the magnet 240 in the attachment feature 114 may further be magnetically coupled with a magnet 250 (part of the second cover magnets 210 shown in FIG. 5) in the keyboard assembly 104. This magnetic coupling may, in combination with the retention feature 128, maintain the attachment feature 114 and the electronic device 300 in a stationary position. Although not shown, the first attachment feature magnets 132 and the second attachment feature magnets 134 may provide a magnetic coupling with magnets of the first device magnets 314 and second device magnets 316, respectively, in a manner similar to that shown in FIG. 8. Also, the first attachment feature magnets 132 and the second attachment feature magnets 134 may provide a magnetic coupling with magnets of the second cover magnets 210 in a manner similar to that shown in FIG. 8.

Figure 9:
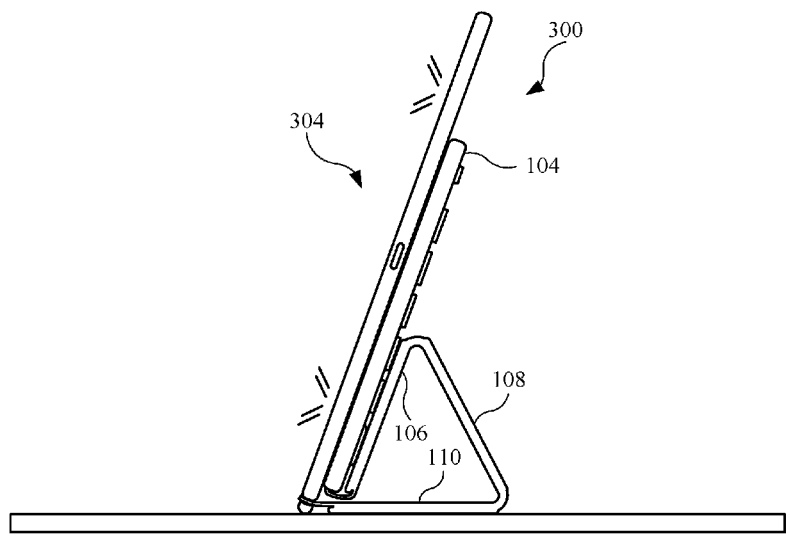
FIG. 9 illustrates a side view of the accessory device coupled with the electronic device, with the accessory device in an alternate folded configuration to further position the electronic device in an upright position.

FIG. 9 illustrates a side view of the accessory device 100 coupled with the electronic device 300, with the accessory device 100 in an alternate folded configuration to further position the electronic device 300 in an upright position. In this configuration, the first segment 106, the second segment 108, and the third segment 110 may again combine to form a triangular support structure. However, in this configuration, the keyboard assembly 104 is disposed behind the electronic device 300 and also used to further support the electronic device. Also, in this configuration, the keyboard assembly 104 may not be in use and a detection mechanism previously described may be used to generate an electrical signal to power down the keyboard assembly 104. The configuration shown in FIG. 9 may be useful when, for example, a user is watching a media file on the display assembly 304, and the keyboard assembly 104 is not needed. Also, the keyboard assembly 104 may be magnetically coupled with the electronic device 300 by way of magnetic couplings between magnetic elements (not shown) in the electronic device 300 and the keyboard assembly 104.

Figure 10:
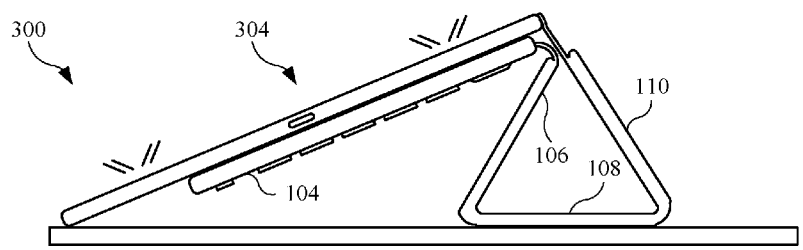
FIG. 10 illustrates a side view of the accessory device coupled with the electronic device, with the accessory device in an alternate folded configuration to position the keyboard assembly behind the electronic device.
Figure 11:
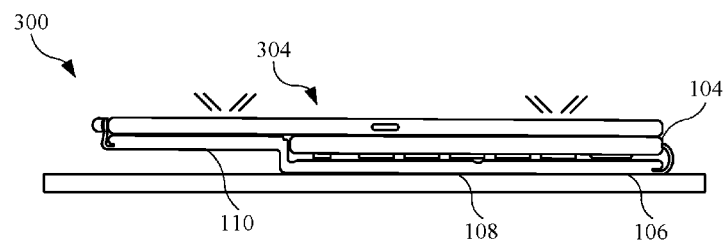
FIG. 11 illustrates a side view of the accessory device coupled with the electronic device, with the accessory device in an alternate folded configuration behind the electronic device such that the accessory device supports the electronic device in a horizontal position.

FIG. 10 illustrates a side view of the accessory device 100 coupled with the electronic device 300, with the accessory device 100 in an alternate folded configuration to position the keyboard assembly 104 behind the electronic device 300. In this configuration, the first segment 106, the second segment 108, and the third segment 110 may again combine to form a triangular support structure. The keyboard assembly 104 is again disposed behind the electronic device 300 and also used to further support the electronic device. Also, in this configuration, the keyboard assembly 104 may not be in use and a detection mechanism previously described may be used to generate an electrical signal to power down the keyboard assembly 104. Also, the keyboard assembly 104 may be magnetically coupled with the electronic device 300 by magnets (previously described). The configuration shown in FIG. 10 may be useful when, for example, a user is elevated with respect to the electronic device 300 and looking down at display assembly 304, and/or when the keyboard assembly 104 is not needed FIG. 11 illustrates a side view of the accessory device 100 coupled with the electronic device 300, with the accessory device 100 in an alternate folded configuration behind the electronic device 300 such that the accessory device 100 supports the electronic device 300 in a horizontal position. In this configuration, the first segment 106, the second segment 108, and the third segment 110 are generally horizontal, with each segment providing a support for the electronic device 300. The keyboard assembly 104 is again disposed behind the electronic device 300 and also used to further support the electronic device. Also, in this configuration, the keyboard assembly 104 may not be in use and a detection mechanism previously described may be used to generate an electrical signal to power down the keyboard assembly 104. Also, the keyboard assembly 104 may be foldable respect to the cover 102, and in particular, the first segment 106 and the second segment 108. Further, the third segment 110 may be raised or elevated with respect to the first segment 106 and the second segment 108 such that when the keyboard assembly 104 is folded over and onto the first segment 106 and the second segment 108, the keyboard assembly 104 is generally co-planar, or flush, with respect to the third segment 110, as shown in FIG. 11. In this manner, the keyboard assembly 104 and the third segment 110 may combine to form a horizontal (or planar) support for the electronic device 300, as shown in FIG. 11. The configuration shown in FIG. 11 may be useful when, for example, when a user places the electronic device 300 on a lap of the user and is looking down at display assembly 304 (shown in FIG. 6) of the electronic device 300. The configuration shown in FIG. 11 may also be useful when the user has relatively limited space, such as when sitting on an airplane or a bus.

Figure 12:
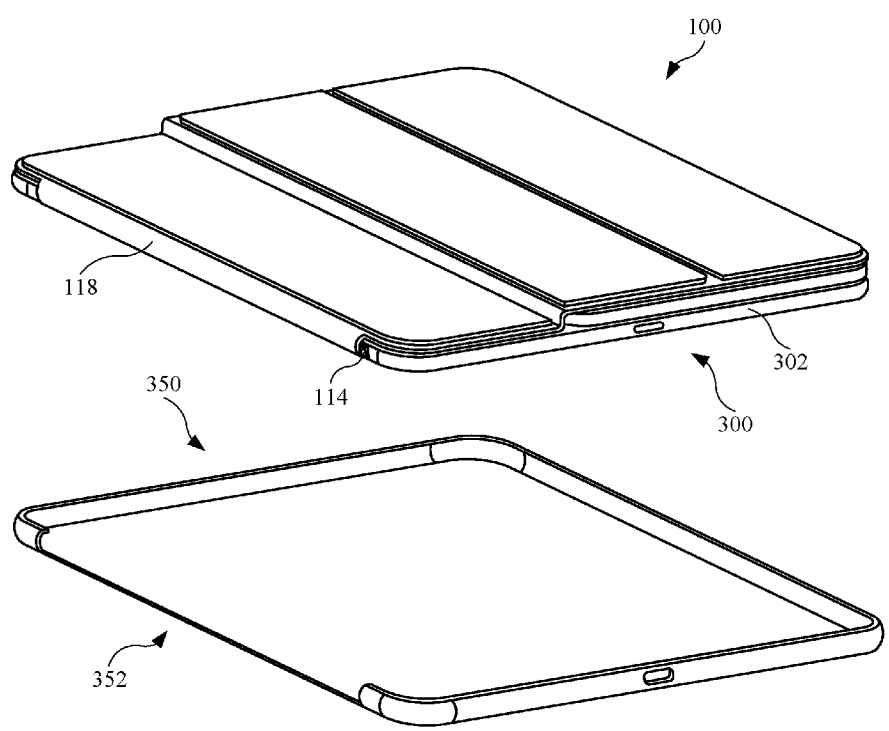
FIG. 12 illustrates an isometric view of the accessory device in a closed configuration, showing the accessory device positioned over the display assembly of the electronic device.

FIG. 12 illustrates an isometric view of the accessory device 100 in a closed configuration, showing the accessory device 100 positioned over the display assembly (not shown) of the electronic device 300. The accessory device 100 may be complementary with other accessory devices. For example, FIG. 12 further shows a second accessory device 350 having a size and shape to receive the electronic device 300 and provide a protective cover around the enclosure 302. Also, the second accessory device 350 may include an opening 352 in a sidewall of the second accessory device 350, with the opening 352 designed to receive the attachment feature 114 and a portion of the second cover layer 118. The second accessory device 350 may include exterior features similar to those of the accessory device 100, such as a similar appearance (color) or feel (texture or roughness). However, the second accessory device 350 may come in various appearances and feels that may differ from those of the accessory device 100.

Figure 13:
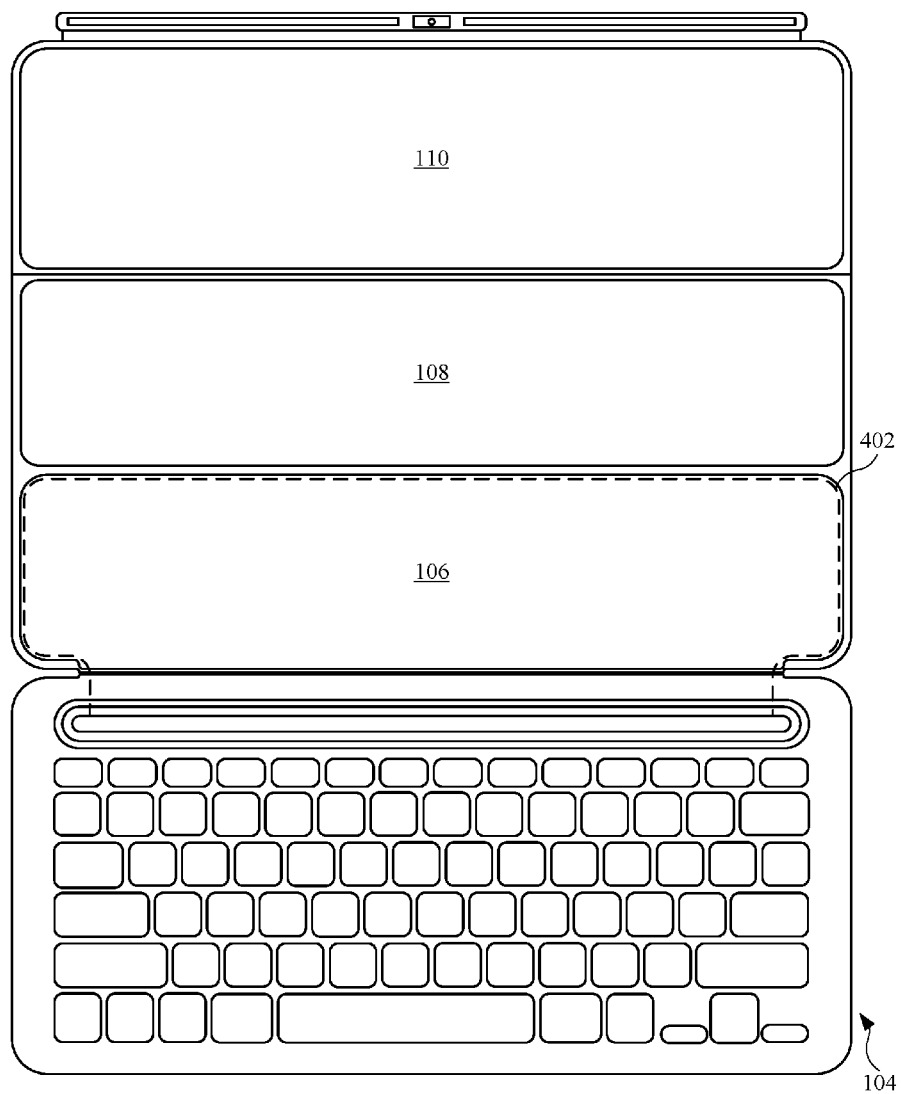
FIG. 13 illustrates a plan view of the accessory device, showing a support layer extending along the first segment and partially onto the keyboard assembly.

In some embodiments, an accessory device may include a feature or features designed to limit movement of a keyboard assembly with respect to a cover. For example, FIG. 13 illustrates a plan view of the accessory device 100, showing a support layer 402 extending along the first segment 106 and partially onto the keyboard assembly 104. In other embodiments, the support layer 402 extends across the second segment 108 and/or the third segment 110. The support layer 402 may include a liquid crystal polymer fiber material. Also, the support layer 402 may include a relatively high tensile strength, similar to that of Kevlar.

Figure 14:
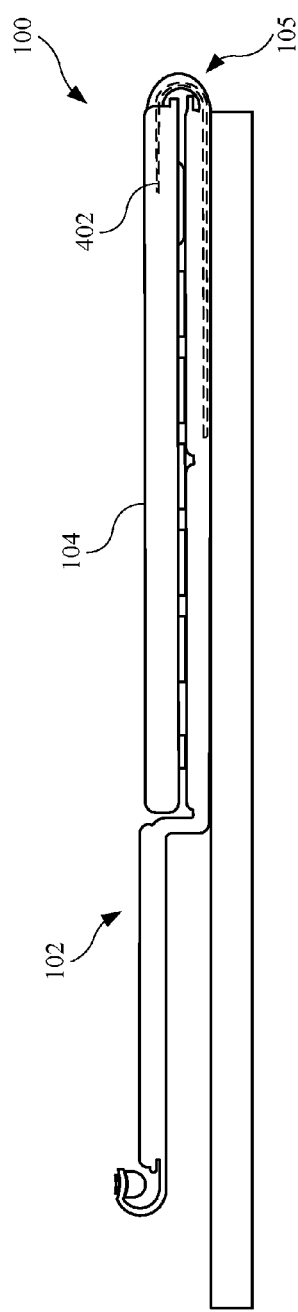
FIG. 14 illustrates a side view of the accessory device, with the keyboard assembly folded over and onto the cover.
Figure 15:
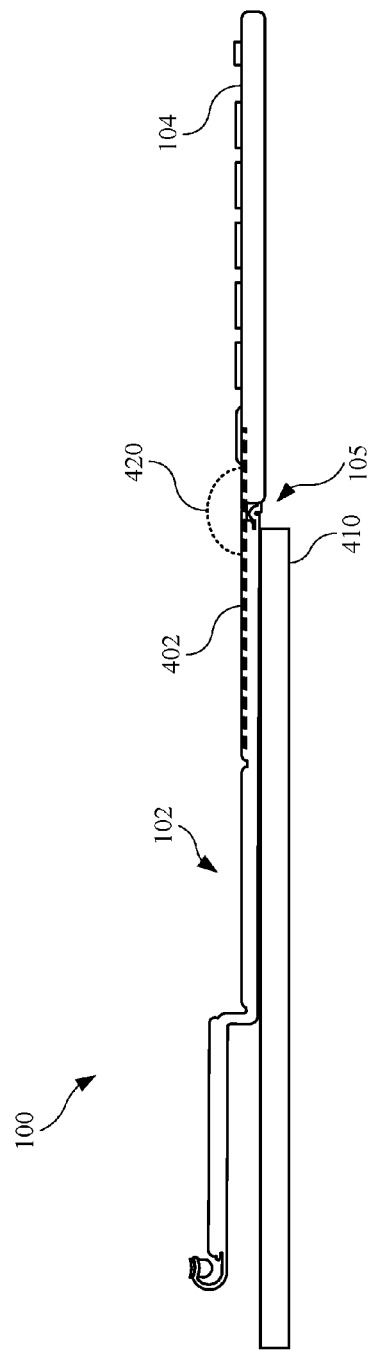
FIG. 15 illustrates a side view of the accessory device, with the keyboard assembly folded away from the cover.

The support layer 402 may be designed and positioned to allow movement of the keyboard assembly 104 with respect to the cover 102 in some directions, and also limit or prevent movement of the keyboard assembly 104 with respect to the cover 102. FIGS. 14 and 15 describe an exemplary rotational movement of the keyboard assembly 104 relative to the cover 102, based in part on the support layer 402. FIG. 14 illustrates a side view of the accessory device 100, with the keyboard assembly 104 folded over and onto the cover 102. As shown, the support layer 402 (denoted as a dotted line) may bend with the hinge 105 to allow movement of the keyboard assembly 104 with respect to the cover 102.

Conversely, FIG. 15 illustrates a side view of the accessory device 100, with the keyboard assembly 104 folded away from the cover 102. As shown, a portion of the accessory device 100 is located near an edge of a surface 410 (such as a table or desk) in a manner such that when the keyboard assembly 104 is folded away from the cover 102, as shown in FIG. 15, the keyboard assembly 104, without additional support, would further fold or rotate away from the cover 102 by gravitational forces. However, the support layer 402 may provide a tension to, and limit movement of, the keyboard assembly 104 and the hinge 105 to a predetermined maximum angle 420 with respect to the cover 102. The predetermined maximum angle may be 180 degrees, or approximately 180 degrees. Also, the predetermined maximum angle 420 also represents an angle less than what the keyboard assembly 104 would otherwise rotate without a support force (such as the surface 410) below the keyboard assembly 104 that would stop rotation of the keyboard assembly 104. This may contribute to an improved user experience of the accessory device 100, as the accessory device 100 may be less flimsy by remaining at a predetermined angle when nothing is below the keyboard assembly 104. Also, although not shown, the support layer 402 may be pre-tensioned to change the predetermined maximum angle 420 to some other angle, for example, greater than 180 degrees.

Figure 16:
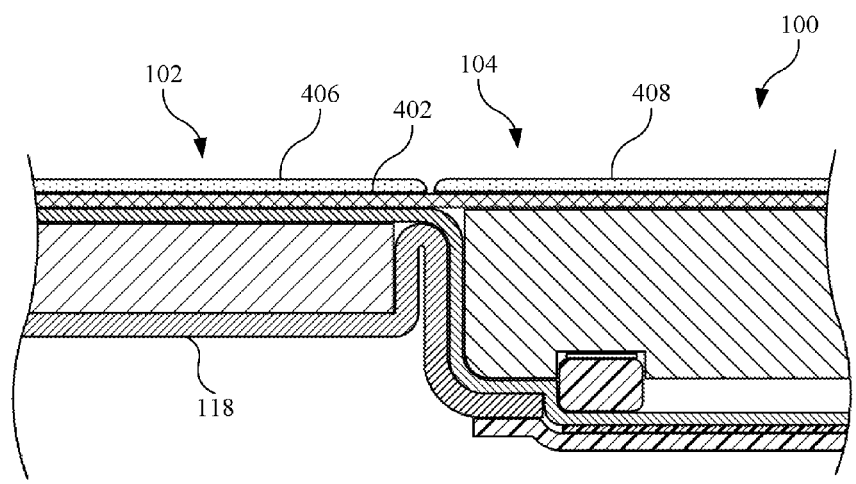
FIG. 16 illustrates a cross sectional view of the accessory device, showing the support layer combining with other features to limit the movement of the keyboard assembly with respect to the cover.

FIG. 16 illustrates a cross sectional view of the accessory device 100, showing the support layer 402 combining with other features to limit the movement of the keyboard assembly 104 with respect to the cover 102. For example, in addition to the tensional forces provided by the support layer 402, the second cover layer 118 may extend from the cover 102 and into the keyboard assembly 104. Further, as shown in FIG. 16, the second cover layer 118 may compress in a location between the cover 102 and the keyboard assembly 104, and a resultant counterforce by the second cover layer 118, based on the compression, may further maintain the keyboard assembly 104 at a desired predetermined angle with respect to the cover 102. Also, FIG. 16 further shows the support layer 402 covered by a first layer 406 and a second layer 408 disposed on the cover 102 and the keyboard assembly 104, respectively. The first layer 406 and the second layer 408 may be cosmetic layers that enhance an appearance of the accessory device 100. In this regard, the first layer 406 and the second layer 408 may include a material such as microfiber.

Figure 17:
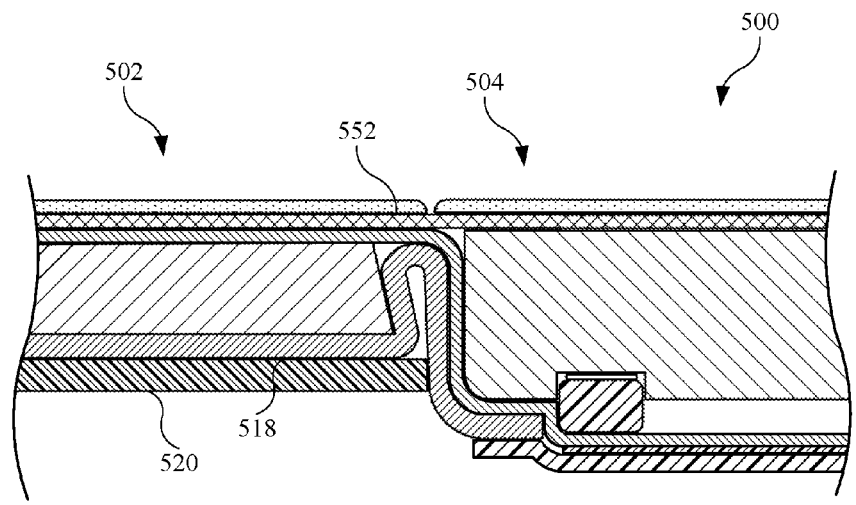
FIG. 17 illustrates a cross sectional view of an alternate embodiment of an accessory device, showing a support layer combining with a rigid layer to limit the movement of a keyboard assembly with respect to a cover.

FIG. 17 illustrates a cross sectional view of an alternate embodiment of an accessory device 500, showing a support layer 552 combining with a rigid layer 520 to limit the movement of a keyboard assembly 504 with respect to a cover 502. The accessory device 500 may include any feature or feature previously described for an accessory device. Also, the support layer 552 may be substantially similar to that of the support layer 402 (shown in FIG. 16). As shown, the rigid layer 520 may include a layer of material that overlays an exterior layer 518 of the cover 502. Also, the rigid layer 520 may include a PTP material. When the keyboard assembly 504 is folded away from the cover 502 in a manner shown in FIG. 17, the rigid layer 520 abuts against the exterior layer 518 in a location in which the exterior layer 518 engages the keyboard assembly 504, thereby prevent the keyboard assembly 504 from further movement. The rigid layer 520 may be positioned in various manners based upon a desired angle between the cover 502 and the keyboard assembly 504.

The keys of a keyboard assembly may provide a feedback, defined by a response of the key to a depression thereof, to a user based in part on the material or materials used to cover the keys. Generally, the feedback is the same for all keys. In some cases, however, a keyboard assembly of an accessory device may include a non-porous material that acts as an air seal to limit or prevent air movement into or out of the keyboard assembly. As a result, the feedback may differ for providing for an inconsistent or undesired user experience.

Figure 18:
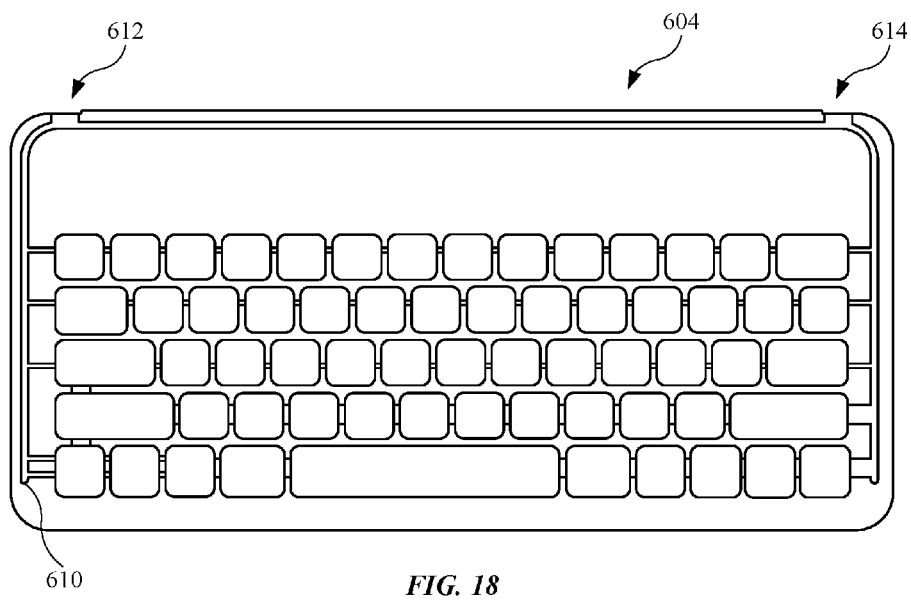
FIG. 18 illustrates an interior view of an embodiment of a top portion of a keyboard assembly, showing a vent system distributed throughout the keyboard assembly that allows passage of air into and out of the keyboard assembly.

However, accessory devices in accordance with the described embodiments may include a keyboard assembly that allows air passage to and from the keys. For example, FIG. 18 illustrates an interior view of an embodiment of a top portion of a keyboard assembly 604, showing a vent system 610 distributed throughout the keyboard assembly 604 that allows passage of air into and out of the keyboard assembly 604. For purposes of illustration and simplicity, several features of the keyboard assembly 604 are removed. The vent system 610 may include a channel, or series of channels, that opens to each of the keys (not shown) of the keyboard assembly 604. The keyboard assembly 604 may further include a first opening 612 and a second opening 614, both of which allow the vent system 610 open to ambient air. In this manner, the vent system 610, by way of the first opening 612 and the second opening 614, may relieve air pressure forming along the keys and allow the keys to remain at or near atmospheric pressure. This may include instances when the keyboard assembly 604 becomes heated (causing air expansion) or cooled (causing air contraction).

Figure 19:
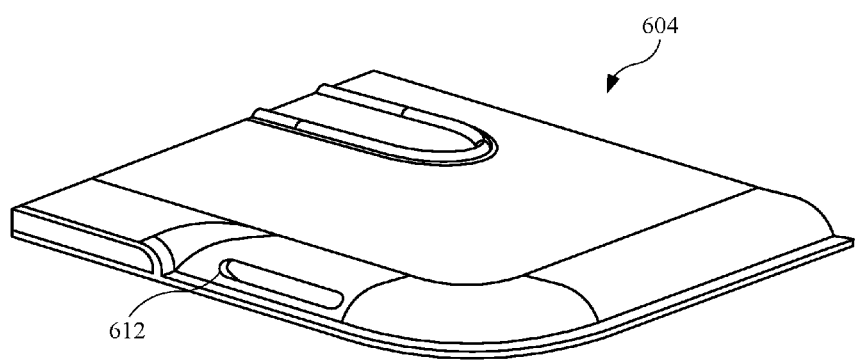
FIG. 19 illustrates a partial exterior view of the top portion of the keyboard assembly shown in FIG. 18, further showing the first opening.

FIG. 19 illustrates a partial exterior view of the top portion of the keyboard assembly 604 shown in FIG. 18, further showing the first opening 612. While the first opening 612 may include an opening free of obstruction (as shown in FIG. 19) in other embodiments, the first opening 612 is covered with a layer of material also used to cover the keyboard assembly 604. In this regard, the layer of material may include polyester. In other embodiments, a mesh feature covers the first opening 612. Generally, any material having some porosity that allows air passage may cover the first opening 612. Further, in other embodiments, the keyboard assembly 604 is laser etched to includes several lozenge, or diamond-shaped, features, in order to reduce an overall appearance of the opening as compared to the first opening 612. The features described for the keyboard assembly 604 shown in FIGS. 18 and 19 may be used in the keyboard assembly 104, shown in FIG. 1.

Figure 20:
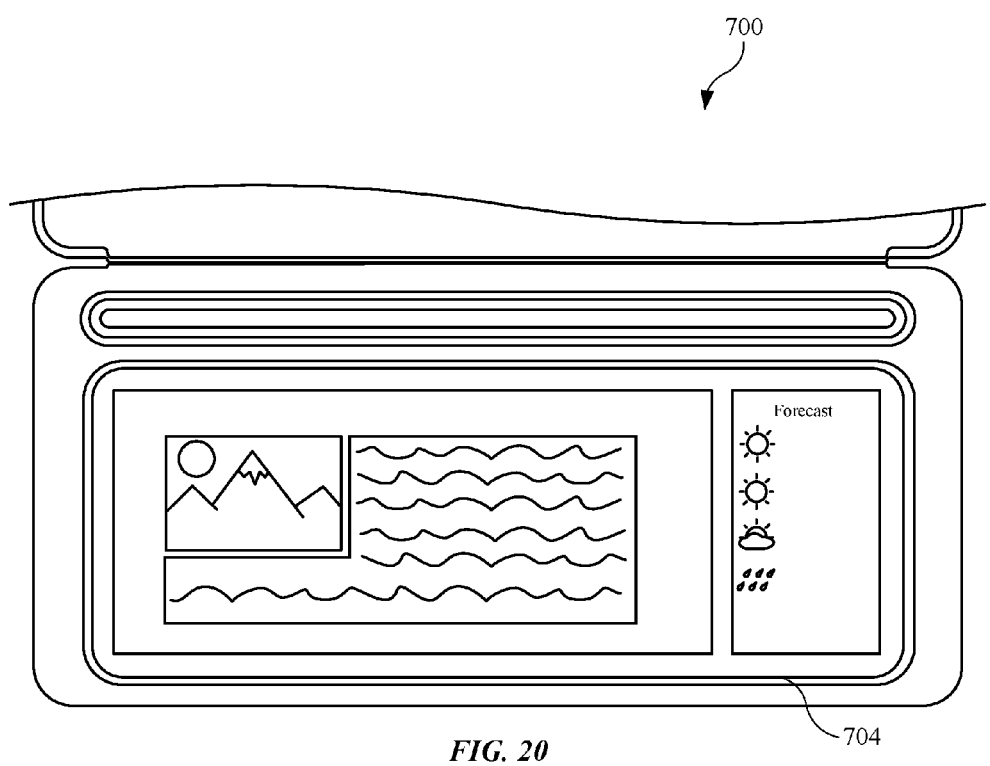
FIG. 20 illustrates a partial plan view of an alternative embodiment of an accessory device having a display assembly in place of a keyboard assembly.

FIG. 20 illustrates a partial plan view of an alternative embodiment of an accessory device 700 having a display assembly 704 in place of a keyboard assembly. The accessory device 700 may include any feature or feature previously described for an accessory device, with the exception of a keyboard assembly. The display assembly 704 may include similar features described for a display assembly 304 of an electronic device 300, shown in FIG. 6, such as visual content display and touch screen capabilities. Also, a detection mechanism (not shown) may be used to power down the display assembly 704 in a manner previously described for powering down a keyboard assembly. The display assembly 704 may provide for a system, that is, the accessory device 700 plus an electronic device (not shown), that includes dual display capabilities. Further, the display assembly 704 can change its visual appearance to present a keyboard assembly used as an input feature by touching the display assembly 704.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. An accessory device suitable for use with an electronic device that includes device magnets and device contact, the accessory device comprising: a foldable cover comprising an attachment feature configured to couple with the electronic device, the attachment feature comprising an electrical contact positioned between a first magnetic element and a second magnetic element; a keyboard assembly hingedly coupled with the foldable cover allowing the keyboard assembly to rotate with respect to the foldable cover; a retention feature extending from the keyboard assembly and providing a structural support for the attachment feature when the attachment feature is at least partially positioned in the retention feature; and an electrically conductive fabric extending from the attachment feature to the keyboard assembly, the electrically conductive fabric providing an electrical communication path between the electrical contact and the keyboard assembly, wherein the first magnetic element and the second magnetic element magnetically interact with the device magnets to align and secure the device contact with the electrical contact.

2. The accessory device of claim 1, further comprising an embedded support layer that extends into the keyboard assembly and the foldable cover, wherein the embedded support layer allows the keyboard assembly to i) fold over and onto the foldable cover and ii) extend away from the foldable cover to a predetermined angle with respect to the foldable cover.

3. The accessory device of claim 1, wherein the foldable cover further comprises a first segment and a second segment, the second segment raised with respect to the first segment such that when the keyboard assembly is folded over and onto the first segment, the keyboard assembly is co-planar with respect to the second segment.

4. The accessory device of claim 1, wherein the foldable cover further comprises a cover layer extending along an exterior surface of the foldable cover and folds over the attachment feature to define a top surface of the attachment feature.

5. The accessory device of claim 4, wherein:
the cover layer comprises an opening,
the electrical contact is in a location corresponding to the opening and electrically coupled with the electrically conductive fabric, the electrical contact configured to electrically couple with the electronic device; and
the cover comprises a layer disposed that extends from the cover and wraps over the top surface of the attachment feature, the layer comprising a first coefficient of friction, and wherein the top surface comprising a second coefficient of friction greater than the first coefficient of friction.

6. The accessory device of claim 1, wherein the keyboard assembly comprises a vent system, the vent system comprises:
an opening that provides the keyboard assembly with air; and
a channel coupled with the opening and to a key of the keyboard assembly thereby allowing the air to pass from a location corresponding to the key and exit the opening.

7. The accessory device of claim 6, wherein the channel opens to all keys of the keyboard assembly.

8. An accessory device suitable for use with an electronic device having a display assembly, a first device magnet, a second device magnet, and an electrical contact, the accessory device comprising: a cover having a size and shape to overlay the display assembly, the cover including a first end and a second end opposite the first end; a keyboard rotatably coupled with the cover at the first end; an attachment feature rotatably coupled with the cover at the second end, the attachment feature comprising: a first magnet capable of magnetically coupling with the first device magnet, a second magnet capable of magnetically coupling with the second device magnet, and a contact capable of electrically coupling with the electrical contact to place the electronic device in electrical communication with the keyboard; and a retention feature positioned on the keyboard, wherein the cover is rotatable with respect to the keyboard such that the attachment feature is positioned in the retention feature.

9. The accessory device of claim 8, wherein the keyboard comprises a keyboard magnet, and wherein the cover comprises a detection mechanism configured to detect an external magnetic field from the keyboard magnet when the keyboard is folded over and onto the cover, the detection mechanism generating an electrical signal in response to detecting the external magnetic field, causing the keyboard to power down.

10. The accessory device of claim 8, wherein the cover comprises an outer layer that extends across the cover, and wherein the attachment feature comprises:
a shunt; and
a protective component formed from a metal, the protective component receiving the shunt, the first magnet, and the second magnet, wherein the outer layer extends over the protective component, the first magnet, the second magnet, and the shunt.

11. The accessory device of claim 10, further comprising a coating that covers the protective component, wherein the outer layer is adhesively secured with the coating such that the attachment feature is capable of rotating with respect to the outer layer.

12. The accessory device of claim 11, further comprising an electrically conductive fabric electrically coupled with the contact and the keyboard, the electrically conductive fabric extending along the protective component.

13. The accessory device of claim 8, wherein the cover comprises a support layer prevents the keyboard from folding away from the cover at an angle no greater than 180 degrees.

14. The accessory device of claim 8, wherein the cover comprises a foldable cover that folds to define a support structure that supports the electronic device and the keyboard such that the keyboard is positioned between the electronic device and the support structure.

15. An accessory device suitable for use with an electronic device, the accessory device comprising: a cover that releasably couples with the electronic device, the cover comprising at least a first segment, a second segment, and a third segment, the second segment between the first segment and the third segment; an attachment feature coupled to the cover, the attachment feature comprising a first magnet capable of magnetically coupling with the electronic device; a keyboard assembly secured with the cover, the keyboard assembly comprising keys located on a planar surface, the keyboard assembly further comprising a retention feature that forms a ring that is elevated with respect to the planar surface; and a second magnet embedded in the keyboard assembly, the second magnet being sub-flush with respect to the planar surface and in a location corresponding to the retention feature such that the second magnet is capable of magnetically coupling with the first magnet when the retention feature receives the attachment feature, wherein each of the first segment, the second segment, and the third segment includes a uniform thickness, and wherein when the keyboard assembly is folded onto the cover, the keyboard assembly is co-planar with respect to the third segment.

16. The accessory device of claim 15, further comprising a support layer that is embedded in the cover, the keyboard assembly, and a hinge connecting the cover and the keyboard, wherein:
the keyboard assembly is coupled to the cover by a hinge,
when the keyboard assembly is folded in a first direction onto the cover, the keyboard assembly is co-planar with respect to the cover, and
when the keyboard assembly is folded in a second direction opposite the first direction, the support layer limits movement of the keyboard assembly with respect to the cover by a predetermined angle.

17. The accessory device of claim 15, wherein the cover comprises a foldable cover that forms a support structure for the electronic device.

18. The accessory device of claim 17, wherein the keyboard assembly is foldable with respect to the foldable cover to fold onto the foldable cover such that the support structure is positioned to support the electronic device and the keyboard assembly.

19. The accessory device of claim 15, wherein the ring is capable of surrounding the attachment feature.

* * * * *